United States Patent [19]

Klos et al.

[11] 4,161,649

[45] Jul. 17, 1979

[54] MULTIMODE ELECTRONIC BRAKE MONITOR SYSTEM

[75] Inventors: Ted Klos, Greenfield; Herman J. Tiedt, Brookfield, both of Wis.

[73] Assignee: American Motors Corporation, Southfield, Mich.

[21] Appl. No.: 863,045

[22] Filed: Dec. 21, 1977

[51] Int. Cl.² .................. G06M 3/02; G07C 3/00
[52] U.S. Cl. .................. 235/92 MP; 235/92 PE; 235/92 T; 235/92 CA; 235/92 R; 192/144
[58] Field of Search ........ 235/92 MP, 92 CT, 92 PE, 235/92 PD, 92 T, 92 CA; 340/52 R, 52 A, 262, 267 R; 73/121; 192/144, 146

[56] References Cited

U.S. PATENT DOCUMENTS

| | | | |
|---|---|---|---|
| 3,750,603 | 8/1973 | Martin | 235/92 PE |
| 3,824,379 | 7/1974 | Tomisawa et al. | 235/92 PE |
| 4,016,407 | 4/1977 | Mesecar | 235/92 T |
| 4,021,647 | 5/1977 | Meier | 235/92 PE |
| 4,048,886 | 9/1977 | Zettler | 192/144 |

Primary Examiner—Joseph M. Thesz
Attorney, Agent, or Firm—Nicholas J. Aquilino

[57] ABSTRACT

A multimode electronic brake monitor system for use with power driven machinery having an absolute shaft encoder input for determining the position of a rotating or reciprocating member of the machinery, wherein both upstroke and downstroke preset allowable braking times are provided. In a normal mode of operation, the brake monitor system monitors each and every cycle of operation of the associated power driven machine and provides a precise measurement and a direct reading display of machine braking time in milliseconds. Automatic shutdown of the monitored power driven machine occurs should the measured braking time exceed either of two preset allowable braking times. In a thumbwheel mode, the brake monitor system is used to initiate a braking sequence at a presettable machine shaft angle whereupon either braking times in milliseconds or in degrees of shaft angle are measured and displayed.

12 Claims, 5 Drawing Figures

MULTIMODE ELECTRONIC BRAKE MONITOR SYSTEM

BACKGROUND OF THE INVENTION

1. Field of the Invention

The present invention relates generally to electronic monitoring of power presses and similar machinery, and in particular to a system for electronically monitoring the braking efficacy for each and every cycle of operation of the powered machine.

More specifically this invention relates to a multimode electronic brake monitor system wherein an absolute encoder is used to provide precise displacement information of key elements of the powered machinery (illustratively a power press) to digital circuitry which performs a number of precision braking-safety related measurements.

2. Description of the Prior Art

In the use of power driven machinery for repetitive production cycles wherein an operator must manually interact with each cycle of operation, an operator safety hazard is always present to some degree. Over the years, many devices and methods have been employed to enhance the safety of manually operated machines while maintaining a suitable level of machine productivity. With power presses, or the like, where an operator must position (or reposition) a workpiece under dies and subsequently initiate a press cycle, it is important that automatic braking action of the press be monitored constantly to assure that an initially established set of safe operating conditions are maintained for the duration of the production run. These considerations have given rise to devices of various types specifically directed to monitoring the conditions of machine brakes under dynamic conditions. Additionally, recent government safety standards which set forth very specific performance requirements for brake monitors have also given rise to devices exhibiting some improvements in the art.

However, as is well known in the power machinery community, braking systems must respond to a wide variety of operating conditions and even for a single specific type of machine with automatic brakes in good operating condition, a wide range of braking times are encountered. Thus, a "cold-brake" stopping time may be substantially different from a "hot-brake" stopping time, and a machine stop order initiated on a downstroke portion of a cycle may take substantially longer to complete than one given on an upstroke portion. The situation is further complicated by the variation in machine stopping times due to the various set-ups used on a given press, and for each weight die used in a press. Any brake monitor which does not include provisions for compensating for these, and other variables, is at least difficult to set up, and may not achieve the proper mix of productivity and safety in order to skirt the problems associated with having an insufficient range of compensation features. Therefore, a brake monitor for a power press must respond sensibly to a range of conditions, and to date a truly satisfactory device has not been available.

Illustrative examples of prior art devices are found in U.S. Pat. No. 4,021,647 to Meier, which discloses an electronic brake monitoring device for use with power presses; in U.S. Pat. No. 3,268,047 to Grygera et al; and in U.S. Pat. No. 3,633,718 to Aystetten et al.

SUMMARY OF THE INVENTION

It is therefore a primary object of this invention to provide improved apparatus for monitoring the dynamic condition of braking systems of powered machinery.

A further object of the present invention is to provide an electronic brake monitoring system having sufficient capabilities to allow for different braking times to be associated with an upstroke or downstroke ordered braking sequence of powered machinery.

Another object of the present invention is to provide a multimode electronic brake monitoring system wherein a determination can be made of either braking time or of braking degrees of the associated powered machine.

Another object of the present invention is to provide a multimode electronic brake monitoring system wherein the monitor may either determine whether the self-initiated braking interval of a machine is within preset limits, or may initiate a braking sequence at any preset angle of the machine cycle.

Another object of the present invention is to provide a multimode electronic brake monitoring system utilizing an absolute shaft encoder to unambiguously determine the precise position of the reciprocating elements of the powered machine, and providing a direct-reading indication of braking performance.

BRIEF DESCRIPTION OF THE DRAWINGS

Additional objects and advantages of the invention will become apparent to those skilled in the art as the description proceeds with reference to the accompanying drawings wherein.

DETAILED DESCRIPTION OF THE PREFERRED EMBODIMENT

Figure 1:
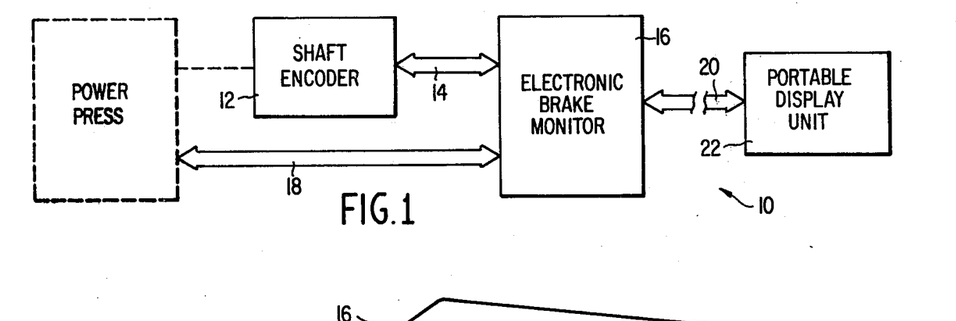
FIG. 1 is an overall block diagram of the multimode electronic brake monitor system according to the present invention.

Referring now to FIG. 1, there is shown a simplified block diagram of a preferred embodiment of the multimode electronic brake monitor system according to the present invention. The overall system 10 is comprised of a shaft encoder 12 coupled by means of a plurality of lines 14 to an electronic brake monitor 16. Shaft encoder 12 is shown as being mechanically coupled to a power press, or the like, shown in dashed lines. A plurality of lines 18 provide electrical interconnection of the power press to the electronic brake monitor 16. A plurality of lines 20 interconnect the electronic brake monitor with a portable display unit 22. A brief overview description of the functioning of the overall system may be facilitated by reference to the system pictorial diagram shown in FIG. 2. Therein, the key elements comprising the shaft encoder 12, the electronic brake monitor 16, and the portable display unit 22 are shown distributed so as to enhance their primary function, that of providing positive monitoring for each and every braking cycle of a power press for the benefit of the press operator. In use, the shaft encoder 12 would be permanently mechanically coupled to an appropriate shaft of the power press so as to provide an absolute readout of the power press shaft angle in degrees, and this information is routed via the group of lines 14 to the electronic brake monitor 16. The brake monitor 16 contains a number of control switches and lamps, as well as the bulk of the electronic control circuitry, and in use would be positioned at a readily accessible location in the vicinity of the control stand for the power press. The portable display unit 22 is the primary mode selection and display readout device for the system and in use would be positioned as to be in the field of view of the press operator, as well as visible to maintenance and safety personnel.

Figure 3:
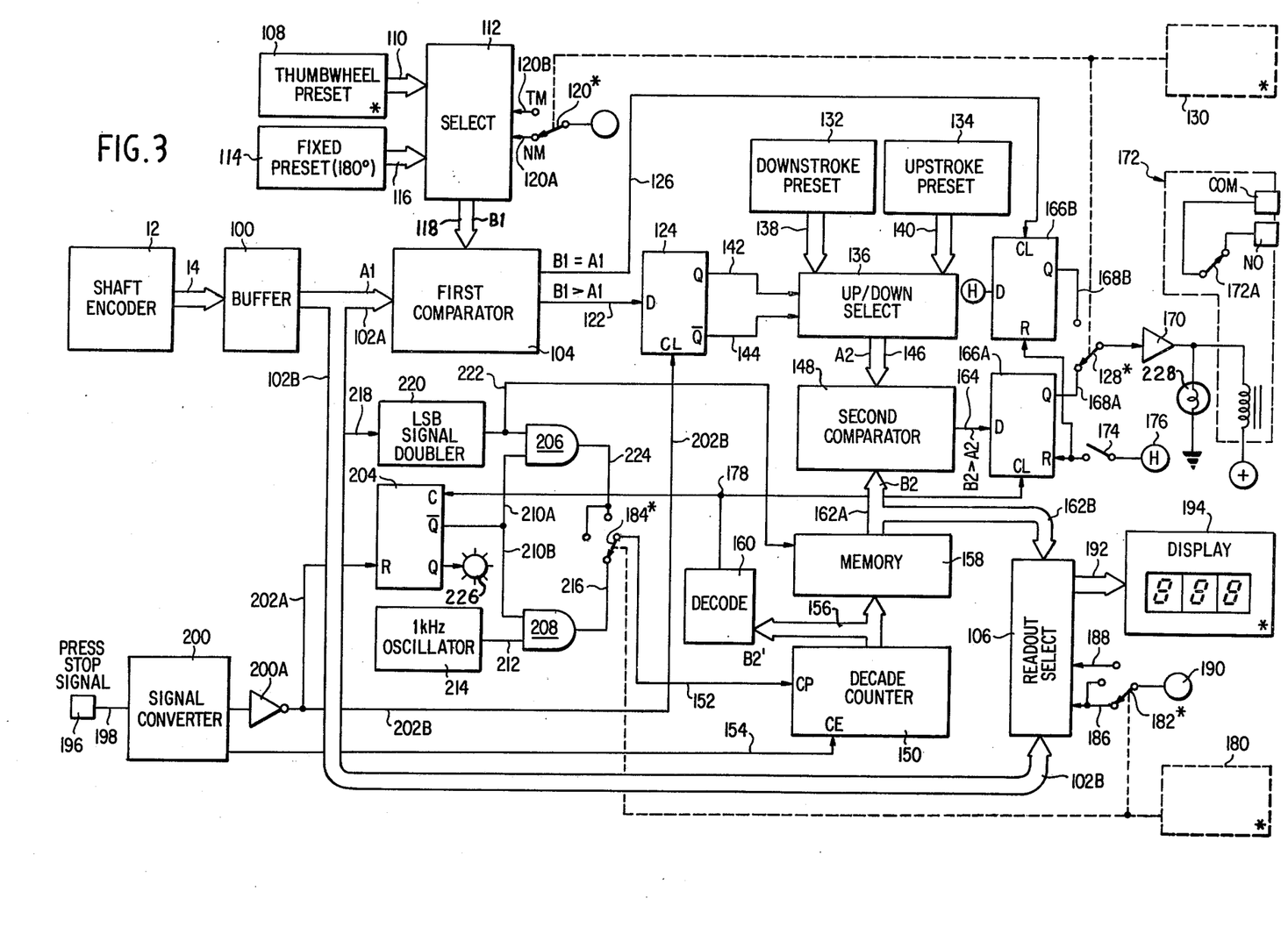
FIG. 3 is a logic diagram of the electronic brake monitor system.

Referring now to FIG. 3, there is shown a logic diagram of the multimode electronic brake monitor system. For ease of description, the elements housed within the electronic brake monitor 16 and the portable display unit 22 have been grouped together functionally into a single diagram. Those elements which may be physically located within the portable display unit 22 are marked with an asterisk.

The output data of shaft encoder 12 is routed via a group of lines 14 through a buffer circuit 100 and thereafter via a group of lines 102A (designated A1 data) to a first input of a first comparator 104, and via a group of lines 102B to a first input of a readout select circuit 106. The shaft encoder 12 provides power press shaft angle of 000° to 359° in three digits of data, each of which is BCD encoded. Thus, twelve parallel lines of data are provided consisting of three significant digits (MSD, ISD and LSD) of four bits each. As is well known, the two most significant bits of the MSD are not absolutely required as the encoder output never exceeds 360°, (the MSD need only indicate 0, 1, 2 or 3) and hence a preferred embodiment of the shaft encoder 12 would provide only 10 usable bits of data via the lines 14 to the buffer 100. The data output on lines 14 is converted within the buffer 100 to voltage levels compatible with the subsequent digital logic elements.

A thumbwheel preset selector 108 has its output coupled via a group of lines 110 to a first input of a select circuit 112. A second input to select circuit 112 is provided from a fixed preset circuit 114 via a group of lines 116. An output from select circuit 112 is routed via a group of lines 118 (designated B1 data) to a second input of the first comparator 104. A mode select switch 120, illustratively shown as a single-pole double-throw type, also is tied into the select circuit 112 via a line 102A designated a normal mode condition, and via a line 120B designating a thumbwheel mode condition. The thumbwheel preset selector 108 is comprised of three individually setable digits (see FIG. 2) representing a preset power press shaft angle in degrees, each digit providing an output of four parallel bits in BCD coded form. Thus the group of lines 110 carries preset angle on twelve lines (preferably, as above, on ten lines). The fixed preset circuit 114 also provides three digits of BCD data on twelve (or ten) lines, the data representing a hardwired, preset angle. Illustratively, the fixed preset circuit 114 is wired to provide the angle 180° to the select circuit 112. The select circuit 112 serves as a multiplexer which provides on its output lines 118 either the data from the thumbwheel preset selector 108 or the data from the fixed preset circuit 114, in response to the position of mode selector switch 120. Normal mode operation causes the output of the fixed preset circuit 114 to be placed on the output lines 118, while thumbwheel mode operation selects the output of the thumbwheel preset selector 108. The select circuit 112 may be comprised of three quad 2-input multiplexer circuit chips, such as are commercially available as CD4019's, having their select lines connected in parallel and connected to the mode selector switch 120 via the stationary contacts on lines 120A and 120B. A first output of the first comparator 104 is routed via a line 122 to a D input of an up/down flip-flop 124. A second output of the first comparator 104 is routed via a line 126 to a first input of an output flip-flop (described below as element 166B) whose output is routed to a first stationary contact (thumbwheel mode position) of a second mode select switch 128. Mode select switches 120 and 128, both single-pole-double-throw types, are actuated in concert by a toggle switch 130, as shown by means of the dashed lines. The toggle switch 130 is shown (in FIG. 2) as being in the normal mode position, and the mode select switches 120 and 128 are shown electrically in FIG. 3 as also being in the normal mode conditions. The alternate position for toggle switch 130 is shown as being a thumbwheel mode, both modes will be described functionally below.

The first comparator 104 performs a continuous digit-by-digit comparison of the two pairs of three input digits applied via lines 102A (A1 data) to its first input, and via lines 118 (B1 data) to its second input, and provides outputs representative of the relative magnitudes of the input data. The first output on line 122 is high (in the positive true logic sense) when input B1 data is greater than A1 data, and the second output on line 126 is high when input B1 data equals A1 data. The first comparator 104 may be comprised of three 4-bit magnitude comparator circuit chips, such as are commercially available as CD4063 (or F40085), wherein auxiliary logic elements are used to combine the results of the magnitude comparisons of each of the three input digits into composite outputs of lines 122 and 126.

A downstroke thumbwheel preset 132 and an upstroke thumbwheel preset 134 have their outputs routed to first and second inputs of an up/down select circuit 136 via groups of lines 138 and 140 respectively. A pair of lines consisting of a line 142 from a Q output of the select flip-flop 124 and a line 144 from the $\overline{Q}$ output of the select flip-flop 124 are routed to the select inputs of the up/down select circuit 136. An output from up/down select circuit 136 is routed via a group of lines 146 (designated A2 data) to a first input of a second comparator 148. The combination of elements comprising the downstroke thumbwheel 132, upstroke thumbwheel 134 and up/down select circuit 136 are structurally and functionally similar to the previously described thumbwheel preset selector 108/select circuit 112 combination. The upstroke and downstroke thumbwheels 132 and 134 are each comprised of three individually setable (see FIG. 2) digits providing outputs of three digits of four parallel bits in BCD coded form. The up/down select circuit 136, under control of the select lines 142 and 144, routes either the twelve data lines on input lines 138 or input lines 140 to the twelve output lines of line 146. However, as the thumbwheel presets 132 and 134 functionally represent 000 to 999 milliseconds, as will be described hereinbelow, all twelve lines are utilized.

A decade counter 150 is configured to accumulate pulses applied to its clock input CP via a line 152 when a suitable logic signal is applied to its count enabling input CE via a line 154. Counter 150 may be comprised of three serially connected decade counters, such as are commercially available as CD4029's, wherein the conventional logic interconnections are implemented to achieve a functionally unitary counter. The twelve line output from counter 150, comprising three digits of four BCD coded bits each (designated B2' data), are routed via a group of lines 156 to the inputs of two parallely connected elements. A first path routes B2' data via lines 156 to the input of a memory 158, and a second path routes B2' data also via lines 156 to a decode circuit 160. The outputs of memory 158 (designated B2 data) are also routed via a group of lines 162A to a second input of the second comparator 148, and a second path routes B2 data via lines 162B to a second input of readout select circuit 106. Functionally, this combination of circuit elements perform similarly to those previously described in connection with the first comparator 104. That is, the second comparator 148 performs a continuous digit-by-digit comparison of the input A2 data and B2 data, and provides an output on a line 164 indicative of the condition B2 greater than A2. The line 164 is applied to a first input of an output flip-flop 166A, whose Q output is routed via a line 168A to a second stationary contact (normal mode position) of the mode select switch 128. A second output flip-flop 166B has its Q output routed via a line 168B to the first stationary contact (thumbwheel mode position) of the mode select switch 128B, as previously described.

The movable contact of mode select switch 128 is routed to the input of a power amplifier 170 and thereafter to a first side of the actuating coil of a brake failure relay 172. A second side of the actuating coil of brake relay 172 is connected to a suitable power source designated "+". The brake failure relay 172 actuates a single-pole-single-throw switch 172A (shown in the energized position) having a normally open fixed contact routed to a terminal NO, and a movable contact routed to a terminal COM. Additional inputs are applied to the output flip-flops 166A and 166B as follows. A single-pole-single-throw key operated reset switch 174 has its movable contact connected to a high logic level source via the terminal 176. A normally open fixed contact of the key operated reset switch 174 is applied to a second input of both output flip-flops 166A and 166B. In operation, the momentary closure of key operated reset switch 174 unconditionally resets the output flip-flops 166A and 166B such that the brake failure relay 172, if it had been deenergized due to a detected brake failure condition, would be immediately energized. Additionally, a logic signal from decode circuit 160 is applied via a line 178 to a third input of the output flip-flop 166A and a high logic level is applied to a D input of the output flip-flop 166B. In actual operation, the output flip-flop 166A serves to deenergize the brake failure relay 172 (designating the alert condition) when the second comparator 148 has made a determination that B2 data (on lines 162A) is greater than A2 data (on lines 146) in normal mode operation, or when the first comparator 104 has made a determination that B1 data (on lines 118) is equal to A1 data (on lines 102A) in thumbwheel mode operation. Complete cycles of operation for the electronic brake monitoring system are given for the various modes of operation hereinbelow. For present purposes, it is sufficient to note merely that an alert condition is detected and acted upon by the circuitry when B2 data is greater than A2 data or, in effect, when the output of the decade counter 150 is greater in value than the output of either the downstroke thumbwheel 132 or the upstroke thumbwheel 134.

Figure 2:
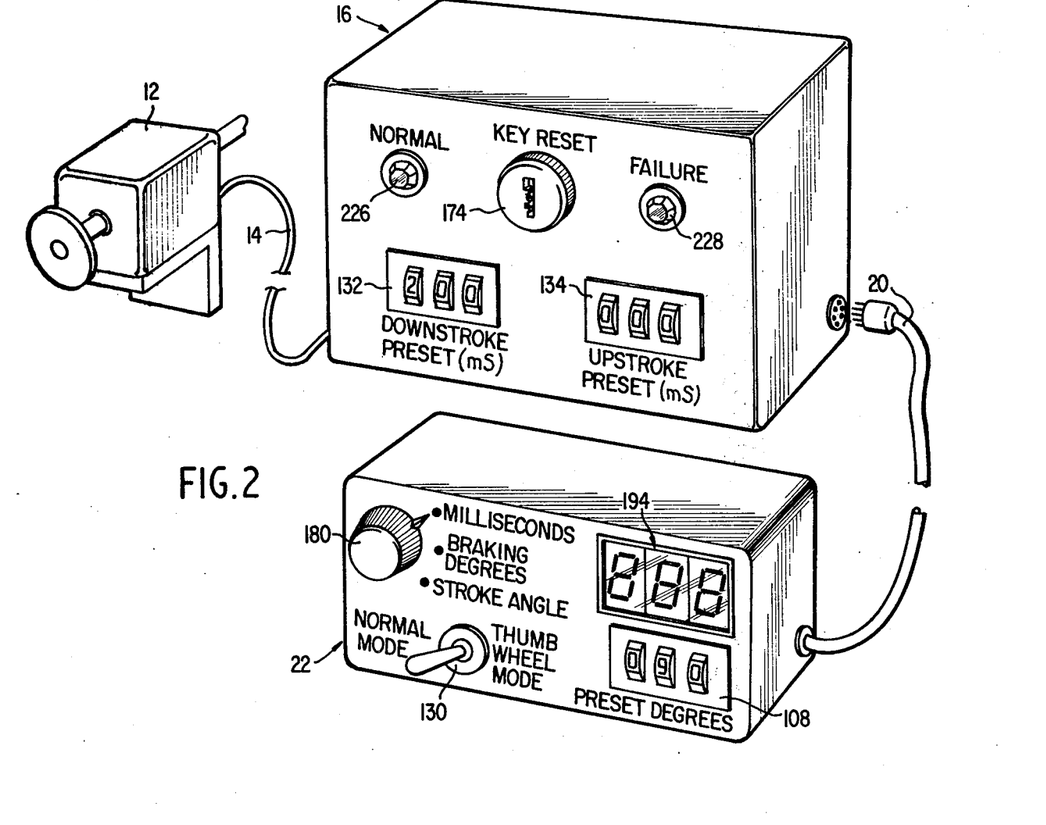
FIG. 2 is a pictorial diagram of an illustrative embodiment of the multimode electronic brake monitor system.

A function/display selector 180 (shown pictorially in FIG. 2) actuates a pair of single-pole-triple-throw function display switches 182 and 184. The function/display selector 180 is shown in FIG. 2 as being in the "milliseconds" position, and the function/display switches 182 and 184 are shown electrically in FIG. 3 as also being in the "milliseconds" position. Function/display switch 182 has a first pair of stationary contacts electrically connected together and applied via a line 186 to a first select input of the readout select circuit 106; has a third stationary contact applied via the line 188 to the second select input of the readout select circuit 106; and finally has its movable contact routed to a suitable logic voltage level via a terminal 190. A data output from the readout select circuit 106 is routed via a group of lines 192 to a display module 194 comprising the circuitry required to implement a three-digit numerical display.

The combination of elements comprising the readout select circuit 106 and the function/display switch 182, in concert with the A1 and B2 data lines are structurally and functionally similar to the previously described thumbwheel preset select 108/select circuit 112 combination. That is, the readout select circuit 106 under the control of the logic signals applied via the lines 186 and 188 routes either the 12 data lines on input lines 162B (B2 data) or the 10 data lines on input lines 102B (A1 data) via the output lines 192 to the display module 194. The logic signals on lines 186 and 188 are configured such that when function/display switch 182 is in either the "milliseconds" position (as shown) or in the "braking degrees" position (one position further clockwise), the output lines 192 will carry B2 data derived from the decade counter 150. When the function/display switch 182 is in the "stroke angle" position (two positions further clockwise than shown) the output lines 192 will carry A1 data as derived directly from the shaft encoder 12 via the buffer 100.

A press stop signal derived from the power press being monitored is applied via an input terminal 196 and a line 198 to a signal converter 200. A first output of signal converter 200, which consists of a signal voltage compatible in level with the subsequent digital logic, is routed via a signal inverter 200A and a line 202A to a reset input of a master flip-flop 204, and via a line 202B to a CL input of the up/down flip-flop 124. A second output from the signal converter 200 is applied via the previously mentioned line 154 to the CE input of the counter 150. The master flip-flop 204 has a signal applied to its C input via the line 178 (from the decode circuit 160) and provides its $\overline{Q}$ output to the first inputs of AND gates 206 and 208 via a pair of lines 210A and 210B respectively. A second input to AND gate 208 is applied via a line 212 from a 1 kHz oscillator 214. The output of AND gate 208 is applied via a line 216 to a first stationary contact (the milliseconds position) of the function/display switch 184. A line 218 carrying data representing the least significant bit of the least significant digit from the group of lines 102B is routed to an LSB doubler 220, and thereafter via a line 222 to a second input of the AND gate 206, and further to a strobe input of the memory 158. An output from AND gate 206 is routed via a line 224 to the remaining two fixed contacts of function/display switch 184.

The functional positions associated with the single-pole-triple-throw function/display switch 184 are identical to those as described in connection with the counterpart function/display switch 182. That is, the function/display switch 184 is shown in the "milliseconds" position and would therefore apply the output from AND gate 208 via the lines 216 and 152 to the CP input of decade counter 150. In both of the alternate two positions of function/display switch 184, representing the "braking degrees" and "stroke angle" positions, the output of AND gate 206 would be routed via the lines 224 and 152 to the CP input of decade counter 150.

Figure 4:
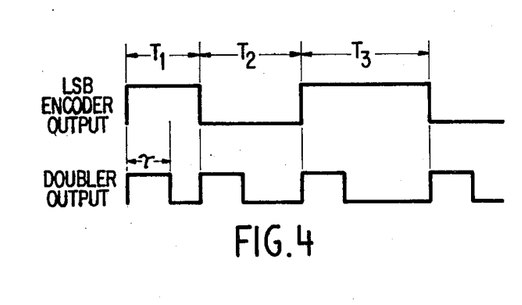
FIG. 4 shows key waveforms of the LSB doubler circuit.

Functionally, the LSB signal doubler 220 operates on the signal from shaft encoder 12 representing one degree granularity and produces a single pulse for each degree of change observed. Referring now to FIG. 4, the time intervals T1, T2, and T3 represent the logic levels of the LSB of the LSD of the shaft encoder output for any arbitrary three degrees of change. As shown, the shaft encoder is slowing down such that successive time intervals between single degree transitions are becoming longer. As the subsequent logic circuitry is responsive to primarily positive going transitions, or to pulses of short fixed durations despite variations in speed of the shaft encoder, the signal doubling provided by the LSB signal doubler 220 becomes necessary. Simply stated, the LSB signal doubler 220 merely converts both positive and negative transitions of the shaft encoder, representing successive changes in the LSB, into pulses having an initial positive going transition and having some fixed predetermined length $\pi$, as shown in the lower waveform of FIG. 4. Also quite obviously, in the absence of any voltage transitions from the shaft encoder—such as would occur when the power press has come to a complete stop—the LSB signal doubler 220 would produce no signals on its output line 222.

The press stop signal applied to the signal converter 200 consists of a 120 VAC signal applied via an isolation relay which parallels the AC signal used to actuate the brake of the power press. Conventionally, the power press brakes are fail-safed such that an application of 120 VAC (or other suitable power voltage) is required to release the brake. Therefore, on occurrence of the press stop signal, input terminal 196 would sense the removal of the 120 VAC signal which signifies the commencement of a press braking sequence. The signal converter 200 converts this input press stop signal to logic level compatible signals in the form of a logically "1" for the press operating signal; which transitions to a logical "0" for a begin press braking condition.

A pair of indicator lamps are positioned on the electronic brake monitor 16 front panel to provide a clear status indication of the electronic brake monitor system at all times. A "normal" lamp 226 and a "failure" lamp 228 are both shown pictorially in FIG. 2. The "normal" lamp 226 is energized via amplifier/buffer circuitry (not shown) taken from the Q output of master flip-flop 204 (shown in simplified form in FIG. 3), and may have a green tinted lens cover. Illumination of the "normal" lamp 226 signifies normal operations of the electronic brake monitor system when in actual use. The "failure" lamp 228 is energized by the power amplifier 170 in the opposite sense to the brake failure relay 172 (as shown in FIG. 3) and may have a red tinted lens cover over it to clearly indicate that a braking failure or other alert condition has occurred.

Cycle of Operation—Normal Mode

In the normal operating mode the electronic brake monitor system, shown pictorially in FIG. 2 and in logic diagram form in FIG. 3, is configured to perform a measurement of the time required for the power press being monitored to come to a complete stop after a braking sequence is initiated. This measurement is provided directly in milliseconds and is conducted for each and every cycle of operation of the press. It should be noted that the predetermined point at which the operator desires the power press to stop is established by means external to the electronic brake monitor system of the present invention. Typically, this is done by mechanical means adjusted by maintenance personnel to suit the particular task being accomplished by the power press. Thus, while the brake monitor system has the capability to shut down the power press under brake failure conditions, a more typical cycle of operation would include only the measurement and display of the stopping time in milliseconds.

Figure 5:
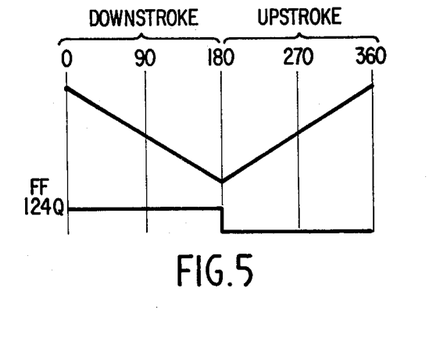
FIG. 5 is a highly schematic representation of a power press cycle.

Referring now briefly to FIG. 5, a highly schematic cycle of operation for a typical power press, or the like, is shown as consisting of a 360° cycle. A conventional description of the uppermost point of a particular press cycle is established as being its zero degree point from which the operating elements of the press descend to make contact with the workpiece at the 180° point and subsequently return to the uppermost position in its cycle at the 360° point. Therefore, any convenient press shaft which carries the rotary motion analogous to this press cycle may be used as a coupling point for the shaft encoder associated with the brake monitor. It is desirable under many operating conditions to provide the power press with starting/stopping points for a particular cycle at other than the 0°/360° points. Therefore, it is not only desirable to distinguish between the first 180° of press operation (the downstroke) and the second 180° (the upstroke) but also to be able to unambiguously and in an absolute manner determine precisely where in a cycle the press elements are at each and every instant of time. The present invention does exactly this, and further uses the resultant shaft angle information to perform a number of highly useful monitoring functions.

Referring now to the logic diagram of FIG. 3, a cycle of operation will be described with the brake monitor system functioning in the normal mode. This mode is established by operator actuation of the toggle switch 130 to the normal mode position; and further by setting the function/display selector 180 to the milliseconds position. The initial conditions for the logic elements are shown in Table 1 below, and illustratively a 200 milliseconds set point has been manually set into the downstroke thumbwheel preset 132. The sequence of events is picked up at a point in the press cycle just prior to initiation of the press stop signal. The voltage at terminal 196 would therefore still be 120 VAC. On initiation of the press braking sequence, the press stop signal transition to 0 VAC which is reflected in the output of the signal converter 200 on the line 154 by a transition from a high logic level to a low logic level thereby enabling the decade counter 150 to begin accumulating pulses at its CP input. The output from the signal inverter 200A transitions from a low logic level to a high logic level thereby resetting the master flip-flop 204, which is immediately reflected by a high logic level being present at its $\overline{Q}$ output, which is passed along to the first input of the AND gate 208. Therefore, the 1 kHz oscillator 214 signals begin passing through AND gate 208, and thereafter via the line 216, the closed contacts of function/display switch 184, and the line 152 to the CP input of decade counter 150 where they are accumulated. Subsequent rotation of the power press shaft after the initiation of a bracking cycle continues to reflect itself in a changing shaft encoder output, and more particularly to changes in the least significant bit of the least significant digit. This signal is coupled via the line 218 to the LSB signal doubler 220 where it is formed into pulses as previously described in connection with the bottom waveform of FIG. 4. These pulses are routed via the line 222 to the strobe input of memory 158 where they serve to transfer the accumulated contents of the decade counter 150 into the memory 158 upon each occurrence of a positive going transition. The contents of memory 158 are applied as B2 data to the second comparator 148 and the readout select circuit 106 as previously described. The readout select circuit 106 has been conditioned by the function/display switch 182 to route the B2 data directly through to the display module 194 which provides a continuous display of the most recent data entered into the memory 158. It should be noted at this point that the specific shaft angle at which the power press has been ordered to initiate a braking sequence has not been specified. Nor has a specific shaft angle been ordered as the power press stopping point. Instead, a maximum allowable time for coming to a stop i.e., the 200 milliseconds set into the downstroke preset, has been established. Therefore if the press stops within the alloted 200 milliseconds, and this is verified by the brake monitor circuitry, the desired monitoring function will have been achieved.

The output of fixed preset 114 representing 180° is applied through the select circuit 112, by virtue of the appropriate setting of the mode select switch 120, via the lines 118 to the first comparator 104. As previously described, this 180° reading is constantly compared with the output of the shaft encoder 12 as applied through the buffer 100 via the lines 102A to the other input of the first comparator 104. The downstroke preset time is applicable to operating conditions wherein the power press has been mechanically adjusted to brake at some portion within the first 180° of the press cycle. Therefore, B1 data on lines 118 (180°) will be greater than A1 data on lines 102A (some angle between 0° and 180°) at the initiation of the braking sequence and hence a high logic level will appear on line 122 and will be applied to the D input of the up/down flip-flop 124. This high logic level representing B1>A1 is clocked into the up/down flip-flop 124 immediately upon the positive-going transition of the press stop signal via the line 202B. The two outputs of the up/down flip-flop are applied via the lines 142 and 144 such that the numerical value set into the downstroke thumbwheel preset 132 is applied via the lines 138 to the up/down select circuit 136 and subsequently via the lines 146 to appear as A2 data to the second comparator 148. Thus the second comparator 148 performs a continuous comparison during the first 180° of press operation between the numerical value 200 milliseconds reflected in its A2 data, and whatever values are transferred into the memory 158 during the braking interval. Assuming that the power press brake is in proper operating condition and does indeed stop the press within the preset 200 milliseconds, the memory 158 never reaches the numerical value of 200 and hence the B2>A2 line 164 remains at a low logic level thereby assuring that the brake failure relay 172 is not deenergized. The total number of 1 kHz pulses actually transferred into the memory 158 is hence a direct measure of the power press braking time in milliseconds. During the time that the power press is being braked to a stop, the shaft encoder 12 continues to rotate progressively slower, and each transition of the LSB will strobe the most recent accumulation of the decade counter 150 into the memory 158 to be applied to the second comparator 148. As the decade counter 150 is accumulating pulses at the rate of 1 kHz, it becomes clear for this particular example that if the LSB transitions cease within 200 milliseconds, (i.e., the power press stops) a value less than 200 will be strobed into the memory 158, and therefore the B2>A2 output of the second comparator 148 will remain quiescent at a low logic level. The decade counter 150, however, continues to accumulate 1 kHz pulses and soon reaches the count of 999, which is decoded in the decode circuit 160 and applied to clock input of the output flip-flop 166A. As the low logic level on line 164, representing the condition $\overline{B2>A2}$, is applied to the D input of output flip-flop 166B, the occurrence of the decoded 999 clock pulse on the clock input of output flip-flop 166A assures that its Q output remains at a low logic level, hence the brake failure relay 172 remains energized. Thus, a complete braking sequence of press operation under normal conditions has been monitored, and any indication of poor brake performance has been quantitatively assessed.

This type of measurement is particularly of value in that it provides not only an accurate measurement of the stopping time for each and every cycle of press operation, but also provides an unambiguous, direct-reading display. The power press operator is thus able to quickly note any deterioration in the efficacy of the press brake mechanism, as this would be immediately reflected in progressively higher readings of the display module 194 on the portable display unit 22.

In the event that the performance of the press braking mechanism deteriorates, or for any other reason allows the power press braking time to exceed the allowable set point stopping time as set into the downstroke thumbwheel preset 132, an automatic brake failure sequence is initiated as will now be described. The description of the above cycle of operation in the normal mode is resumed at a point subsequent to the initiation of the press stop signal but before the press has come to a complete stop. As long as the contents of memory 158 stayed numerically below the value set into the downstroke thumbwheel preset 132 (illustratively 200 milliseconds) the output on line 164 from the second comparator 148 remained at a low logic level which precluded the deenergization of the brake failure relay 172. If the power press continues rotating, however slowly, and LSB transitions continue to be applied via the line 222 to strobe the outputs of the decade counter 150 into the memory 158, the value reflected into memory 158 would continue to increase at 1 count per millisecond and eventually would cause B2 data to be greater than A2 data and the output line 164 to transition to a high logic level. The clocking operation of output flip-flop 166A has been previously described and it is sufficient to note that upon a high logic level being presented on the line 164, the Q output flip-flop 166A will be clocked at the decoded count of 999, by the decode circuit 160, to a high logic level, which will deenergize the brake failure relay 172. The normally open pair of contacts associated with the single-pole-single-throw switch 172A are connected via lines (not shown) to serve as an interlock in the drive motor circuit of the power press such that upon opening of the switch 172A, drive power is immediately removed and subsequent operation of the power press is inhibited. The output flip-flops 166A and 166B are configured such that once their Q outputs have been clocked to a high logic level, they may not be reset other than by use of the key operated reset switch 174. Therefore, when the second comparator 148 has made a determination that the predetermined set point stopping time has been exceeded, for whatever reason, further operation of the power press is precluded until the appropriate maintenance and/or safety personnel have been notified. This effectively precludes any potentially unsafe subsequent operation of the press.

While a cycle of operation has been described for downstroke preset time, it is obvious that the circuit would function similarly for an upstroke situation. Indeed, both downstroke and upstroke values may be set into their respective thumbwheel presets 132 and 134, and the particular time at which the power press braking sequence is initiated will determine which preset time is applicable.

Completing a full cycle of circuit operation, we note that while the decade counter 150 continues to accumulate clock pulses at the 1 kHz rate they are only transferred into the memory 158 for comparison in the second comparator 148 as long as there continues to be press shaft angle rotation as reflected in continuing transitions of the LSB. The logic circuitry is returned to the quiescent condition upon the decade counter 150 reaching a count of 999 which is decoded by the decode circuit 160. The output of the decode circuit 160 is applied via the line 178 as previously described which clocks the master flip-flop 204 back to the initial condition as detailed in Table 1, thereby disabling AND gate 208 and interrupting the train of 1 kHz pulses applied to the decade counter 150.

ALTERNATE OPERATING MODES AND EMBODIMENTS

The electronic brake monitor system may be configured to operate in a second mode, the thumbwheel mode, wherein its primary function is to brake the power press with which it is associated at some predetermined angle. This mode would typically be used for test and evaluation of the power press braking efficacy rather than for monitoring each braking sequence during a production run. A major purpose of the thumbwheel mode is to establish a "safety distance" as required for compliance with Federal regulations. Briefly, the thumbwheel mode allows for the insertion into the brake monitor system of a preset press shaft angle at which braking action is to be initiated and evaluated. As the power press reaches the preset shaft angle, a braking sequence is automatically initiated and a quantitative measure of braking time (or braking angle) is accomplished and displayed.

Referring now to the logic diagram of FIG. 3, a cycle of operation in the thumbwheel mode will be described. The mode is established by operator actuation of the toggle switch 130 to the thumbwheel mode position, which moves the mode select switches 120 and 128 one position further clockwise than shown. A desired preset angle is set into the thumbwheel preset selector 108. Illustratively, a 90° preset angle, as shown pictorially in FIG. 2, is inserted. All other initial conditions of Table 1 are as tabulated and are applicable in this mode. The sequence is picked up at a point in a press test cycle just prior to the press arriving at the preset angle. The output of the thumbwheel preset 108 would be present on the lines 118 as B1 data by virtue of the action of select circuit 112 in response to the mode select switch 120. As before, the output shaft encoder 12 is presented as A1 data to the first comparator 104 via the buffer 100 and the lines 102A. When the press shaft angle coincides with the preset angle, the B1=A1 output on line 126 momentarily transitions to a high logic level which serves to clock the output flip-flop 166B to the set (Q output goes high) condition. This high logic level is routed via the line 168B and the thumbwheel position of the mode select switch 128 to the power amplifier 170 thereby deenergizing the brake failure relay 172. The brake relay 172 in turn removes the drive power from the press via the contacts 172A as previously described, and the press is caused to brake to a stop.

The measurement of the braking time is accomplished identically as described in connection with normal mode operation and the resulting measurement of braking time in milliseconds is displayed on the display module 194 for computing safety distances. In contrast to the normal mode operation, it should be noted that the power press has been ordered to initiate a braking sequence at a specific, preset angle. As previously mentioned, the braking times for power presses vary for a number of conditions, including, of course, the press angle at which braking is initiated. 90 degrees has been selected in this example as being a "worst case" set of conditions for many press configurations. Other preset angles may obviously be used to suit the particular press conditions which it is desired to evaluate.

In addition to determining braking time for various preset angles, the brake monitor may also be used to determine braking angles, as well as to provide a direct readout of press shaft angles. Accordingly, if the brake monitor system is preset for automatic braking, via the thumbwheel mode, and the function/display selector 180 is set to the braking degrees position, then when the press is cycled the press shaft should end up at a position equal to the preset angle plus the braking angle. For example, if the preset angle in the thumbwheel preset 108 is 90° and the resulting braking angle in display module 194 is 30°, then the press shaft angle should be at 120°. A cycle of operation to illustrate this capability is described in connection with the thumbwheel mode. All initial conditions as previously outlined for this mode are applicable, and additionally, the function/display switch 180 is operator positioned to the braking degrees position. Again, the sequence is picked up at a point in the press test cycle just prior to the press arriving at the preset angle. The braking action is initiated as before; i.e.—B1=A1 on line 126 causes setting of the output flip-flop 166B which deenergizes brake failure relay 172 and disables the power press.

With continued reference to FIG. 3, note that the function/display switches 182 and 184 are now one position further clockwise from those shown and that the output from AND gate 206 is now routed to the CP input of decade counter 150. On transition of the $\overline{Q}$ output of master flip-flop 204 to the high logic level due to the action of the press stop signal on terminal 196, the AND gate 206 is enabled. The output of the LSB signal doubler 220, which contains one pulse for each degree of rotation of the shaft encoder 12, (as shown in FIG. 4) is passed through AND gate 206, via line 224, through the function/display switch 184, and via the line 152 to the decade counter 150. The decade counter 150 therefore accumulates one pulse for each degree of rotation of shaft encoder 12 during the braking interval, and as before the LSB pulses strobe the output of decade counter 150 into the memory 158. The output of the memory 158 is applied to the display module 194 for direct readout of the total shaft angle excursion in degrees during the braking interval. (Note that the second comparator circuitry plays no part in this mode.) When the shaft encoder 12 comes to a stop signifying completed braking action, both LSB pulse accumulation and LSB strobe pulses cease and the display module 194 holds the last value transferred.

By operator actuation of the function/display selector 180 to the strobe angle position, a direct readout of the press shaft angle is obtained. The function/display switch 182 would be in the most counterclockwise position and the readout select circuit 106 would apply the A1 data, representing shaft encoder 12 output, via the lines 192 to the display module 194. A direct reading of press shaft angle would result. It should be noted that this direct reading capability is unconditional. That is, it is applicable in either mode of the brake monitor and can be used at any time. One useful application of this feature has been suggested above, that of verifying that the sum of preset angle and braking angle is indeed equal to the press shaft angle. The direct reading capability may also be used for determining the actual press shaft angle during press set up and during press brake maintenance. Its main utility is the ability to provide an absolute and unambiguous reading of press shaft angle at any time.

The circuit elements illustratively cited to perform the various digital functions in the electronic brake monitor 16 and the portable display unit 22 are of SSI and MSI complexity and employ n and p-channel MOS technology. It is pointed out that all of these elements may readily be implemented via other technologies (TTL, etc.) or on an LSI scale. Thus, an embodiment wherein a microprocessor is used to implement the desired multiplexing of, for example—the up/down select circuit 136, or to implement the decade counter 150, may be considered wholly equivalent to the illustrative embodiments disclosed herein.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

TABLE 1

| NORMAL MODE INITIAL CONDITIONS | | |
| --- | --- | --- |
| Element | Symbol | Condition/Position |
| toggle switch | 130 | normal mode position |
| function/display switch | 180 | milliseconds position |
| downstroke thumbwheel preset | 132 | preset braking time* |
| upstroke thumbwheel preset | 134 | preset braking time* |
| thumbwheel preset degrees | 108 | 90°** |
| decade counter | 150 | disabled |
| master flip-flop | 204 | set to Q=1 |
| up/down flip-flop | 124 | may be either Q=0,=1 |
| output flip-flop | 166 | clocked to Q=0 |
| brake failure relay | 172 | energized |

*at least one must be preset
**applicable in thumbwheel mode only

What is claimed is:

1. An electronic brake monitor for determining when the braking time of a machine having a reciprocating member and means for braking said member and means for initiating said braking means exceeds at least one of a plurality of preset braking times, comprising:
    (a) encoder means coupled to said member for providing an output corresponding to the absolute position of said member;
    (b) a generator for producing clock pulses;
    (c) a digital counter connected to said generator and enabled to accumulate clock pulses in response to said initiating means;
    (d) preset means responsive to said encoder output and said initiating means for establishing at least a first and second mutually independent preset braking times, and for selection of a first preset braking time when said member is moving in an upstroke direction and for selection of a second preset braking time when said member is moving in a downstroke direction;
    (e) memory means connected to said counter and responsive to changes in said encoder output for accepting the accumulated contents of said counter;
    (f) comparator means connected to said preset means and to said memory means for producing an alert condition when the contents of said memory means exceeds said selected preset braking time.

2. The electronic brake monitor as recited in claim 1 wherein said memory means acceptance of the accumulated contents of said counter ceases upon cessation of changes in said encoder output.

3. The electronic brake monitor as recited in claim 1 further comprising interlock means connected to said comparator and to said machine for inhibiting subsequent operation of said machine on occurrence of said alert condition.

4. The electronic brake monitor as recited in claim 1 wherein said encoder means comprises a shaft encoder coupled to a rotary shaft having a predetermined relationship with said reciprocating member.

5. The electronic brake monitor as recited in claim 4 further comprising display means connected to said memory means for displaying the contents of said memory.

6. The electronic brake monitor as recited in claim 5 wherein said clock pulses have a predetermined rate and said display means provides a reading in seconds or in decade fractions thereof.

7. The electronic brake monitor as recited in claim 6 further comprising strobe generating means connected to said shaft encoder for producing transfer pulses solely in response to changes in the output of said encoder whereby said transfer pulses serve to cause said memory means to accept the contents of said counter.

8. An electronic brake monitor for determining when the braking time of a power driven machine exceeds at least one of a plurality of preset braking times, said machine having a rotary member connected to a reciprocating member and means for braking said members and means for initiating said braking, said monitor comprising:
    (a) shaft encoder means coupled to said rotary member for providing an absolute shaft position output of said rotary member;
    (b) a generator for producing clock pulses;

(c) a digital counter connected to said generator and enabled to accumulate clock pulses in response to said initiating means;

(d) first preset means connected to said encoder, for providing sector signals designating first and second predetermined portions of said shaft position;

(e) second preset means responsive to said initiating means and said sector signals for establishing at least a first and second mutually independent preset braking time, and for selection of a first preset braking time when said sector signal designates a first portion of said shaft position and for selection of a second preset braking time when said sector signal designates a second portion of said shaft position;

(f) memory means connected to said counter and responsive to changes in said encoder output for accepting the accumulated contents of said counter; and (g) comparator means connected to said preset means and to said memory means for producing an alert condition when the contents of said memory means exceeds said selected preset braking times.

9. An electronic brake monitor for determining the braking time of a power driven machine, said machine having a reciprocating member and means for braking said member and means for initiating said braking means in response to a conincidence signal from said brake monitor, said monitor comprising:

(a) encoder means coupled to said member for providing an output corresponding to the absolute position of said member;

(b) preset means for establishing an output corresponding to a predetermined position in the traverse of said reciprocating member;

(c) comparator means connected to said encoder means and to said preset means for generating said coincidence signal when the encoder output and the preset output are coincident;

(d) a pulse circuit for producing count pulses;

(e) a digital counter connected to said pulse circuit and enabled to accumulate count pulses in response to said initiating means;

(f) memory means connected to said counter and responsive to changes in said encoder output for accepting the accumulated contents of said counter;

(g) display means connected to said memory means for displaying the contents of said memory.

10. The electronic brake monitor as recited in claim 9 wherein said count pulses have a predetermined rate and said display means provides a reading in seconds or in decade fractions thereof.

11. The electronic brake monitor system as recited in claim 9 wherein said pulse circuit produces count pulses corresponding to changes in said encoder output position and said display means produces a reading directly in units corresponding to said absolute position output.

12. The electronic brake monitor as recited in claim 11 wherein said encoder means comprises a shaft encoder coupled to a rotary shaft having a predetermined relationship with said reciprocating member.

* * * * *